United States Patent Office 2,873,270
Patented Feb. 10, 1959

2,873,270

MONOAZO DYESTUFFS

Ernst Merian, Allschwil, near Basel, Switzerland, assignor, by mesne assignments, to Saul & Co., Newark, N. J., as nominee of Fidelity Union Trust Company, executive trustee under Sandoz trust No Drawing. Application January 12, 1953
Serial No. 330,890

Claims priority, application Switzerland January 18, 1952

6 Claims. (Cl. 260—205)

The present invention relates to monoazo dyestuffs which dye acetate silk, polyamide fibers and polyester fibers in orange-brown to violet-brown shades, and the dyeings of which are distinguished by excellent fastness to light, to washing, to sublimation and which are stable with respect to the so-called "gas fumes."

The monoazo dyestuffs of the present invention correspond to the formula

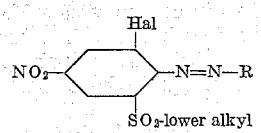

wherein Hal stands for a halogen atom, and R stands for the radical of a tertiary amine of the benzene series, which is free from water solubilizing groups and the nitrogen atom of which carries one cyanoalkyl group.

More specifically the said dyestuffs correspond to the formula

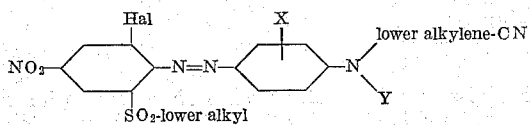

wherein Hal stands for a halogen atom, X stands for hydrogen, lower alkyl or halogen, and Y stands for lower alkyl or lower hydroxyalkyl.

A primary object of the present invention is the improvement of the fastness properties of brown acetate dyes.

Brown acetate dyes have heretofore been produced by coupling diazotized 1,3-dihalogeno-5-nitro-2-aminobenzenes with tertiary amines of the benzene series, containing no cyanoalkyl group. They have, as for instance the well known dyestuff

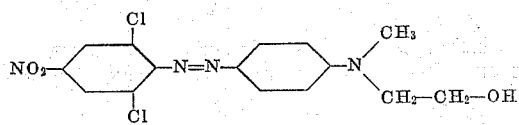

poor fastness to washing and only moderate fastness to light and to gas fumes. By replacing the azo component of the aforementioned type by a tertiary amine of the benzene series the nitrogen atom of which carries one cyanoalkyl group, the fastness properties of the dyestuffs thus obtained are no doubt improved but the shade of the coloring turns to a useless yellowish brown. On the other hand it is known to couple diazotized 1-halogeno-2 - amino - 5 - nitro - benzene - 3 - alkylsulfones with tertiary amines of the benzene series containing no cyanoalkyl groups. The thus obtained dyestuffs turn to violet shades possessing low fastness properties. It is also known that diazotized nitroaminobenzenes, which contain an alkylsulfone group but no halogen, can be coupled with tertiary amines of the benzene series which contain at least one cyanoalkyl group on the nitrogen atom. However, the thus obtained dyestuffs dye acetate silk in pure bluish red and not in brown shades. It is, therefore, surprising that a new combination of known diazo and azo components leads to new dyestuffs possessing simultaneously a desired brown shade and improved fastness properties. The outstanding utility of my new monoazo dyestuffs is apparent from the fact that they yield dyeings on cellulose acetate textile materials which are twice as fast to light and three to five times as fast to "gas fumes" as the dyeings obtained with the dye of the formula

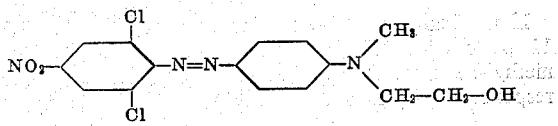

which is one of the best—if not the best—brown azo dye now available for dyeing cellulose acetate textile material.

Illustrative of amines which may be employed in preparing diazo compounds suitable for use in making the monoazo dyestuffs of the present invention are the 1-fluoro - 2 - amino - 5 - nitrobenzene - 3 - alkylsulfones, the 1-chloro-2-amino-5-nitrobenzene-3-alkylsulfones, the 1 - bromo - 2 - amino - 5 - nitrobenzene - 3 - alkyl-sulfones and the 1-iodo-2-amino-5-nitrobenzene-3-alkyl-sulfones.

Suitable azo components for coupling with the diazo compounds enumerated in the preceding paragraph are for example N-methyl-N-cyanoethyl-aminobenzene, N-ethyl - N - cyanoethyl - aminobenzene, N - hydroxyethyl-N-cyanoethyl-aminobenzene, N-hydroxypropyl-N-cyanoethyl - aminobenzene, N - glyceryl - N - cyanoethyl-aminobenzene, N - hydroxybutyl - N - cyanoethyl-aminobenzene, 1 - (N - methyl - N - cyanoethyl) - amino-3 - alkylbenzene, 1 - (N - ethyl - N - cyanoethyl) - amino-3 - alkylbenzene, 1 - (N - hydroxyethyl - N - cyanoethyl) - amino - 3 - alkylbenzene, 1 - (N - hydroxypropyl - N - cyanoethyl) - amino - 3 - alkylbenzene, 1 - (N - hydroxybutyl - N - cyanoethyl) - amino - 3-alkylbenzene, N - methyl - N - cyanomethyl - aminobenzene, N - ethyl - N - cyanomethyl - aminobenzene, N-hydroxyethyl - N - cyanomethyl - aminobenzene, 1 - (N-methyl - N - cyanoethyl) - amino - 3 - halogenobenzene, 1 - (N - ethyl - N - cyanoethyl) - amino - 3 - halogenobenzene, 1 - (N - hydroxyethyl - N - cyanoethyl) - amino-3 - halogenobenzene, and so on. By halogen atoms, in the sense of the present invention, are meant fluorine, chlorine, bromine or iodine atoms; by alkyl radicals are meant lower alkyl radicals, such as especially methyl, ethyl, propyl and butyl. All these tertiary amines of the benzene series should be free from water-solubilizing groups. The term "water solubilizing groups" throughout this specification stands for sulfonic and carboxylic acid groups.

The following examples illustrate the invention without, however, being restrictive thereof. In the said examples, the parts and percentages are by weight, and the temperatures are in degrees centigrade.

Example 1

15 parts of 1-bromo-2-amino-5-nitrobenzene-3-methyl-sulfone are added at 60° to 65 parts of 94% sulfuric acid and diazotized at 60–70° with 3.5 parts of sodium nitrite. The reaction is completed after 1 hour. The reaction mixture is allowed to cool, poured onto 100 parts of water and 400 parts of ice, and 10 parts of N-hydroxyethyl - N - cyanoethyl-aminobenzene are then added. Coupling is completed after a short time; the dyestuff formed is isolated. It dyes acetate rayon and polyester fibers in neutral brownish tints of excellent fastness to light, washing, sublimation and gas fumes. Furthermore, the dyeings are well dischargeable. The shade on polyamide fibers is slightly more red in color. It corresponds to the formula

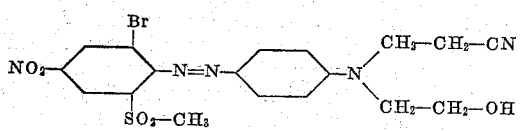

and dissolves in concentrated sulfuric acid with a red-orange, and in ethanol with a brown color.

*Example 2*

If in Example 1 the azo component is replaced by 11 parts of 1-(N-hydroxyethyl-N-cyanoethyl)-amino-3-methyl-benzene, then a dyestuff is obtained which corresponds to the formula

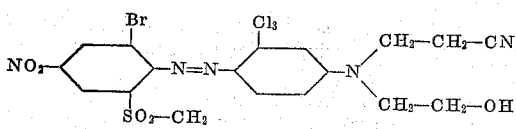

and which dyes acetate rayon and polyester fibers in reddish-brown tints of very good fastness to light, washing, sublimation and gas fumes. The dyeing on polyamide fibers is slightly more bluish tinted in color. The new dyestuff is soluble in concentrated sulfuric acid with a red-orange and in ethanol with a red-brown color.

*Example 3*

50 parts of 1-chloro-2-amino-5-nitrobenzene-3-methyl-sulfone are stirred into 260 parts of concentrated sulfuric acid. At 60°, 14 parts of sodium nitrite are added, whereupon agitation is continued for some time at 60°–70°. When the diazotization is completed, the reaction mass is cooled to 20° and poured into 400 parts of water, 1600 parts of ice and 40 parts of N-hydroxyethyl-N-cyanoethyl-aminobenzene, whereupon coupling begins. After the complete formation of the dyestuff the suspension is filtered off, washed free of acid and dried. The resulting dark-brown powder dyes acetate silk from an aqueous dispersion in reddish brown shades of excellent fastness to light, to washing, to sublimation and to gas fumes. The tints on polyamide fibers are slightly redder. The new dyestuff corresponds to the following formula:

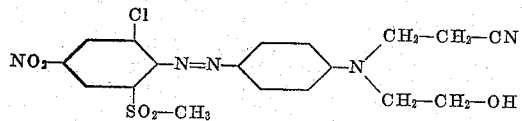

It dissolves in concentrated sulfuric acid with or without addition of boric acid with a red-orange and in ethanol with a brown coloration.

*Example 4*

If in Example 1 the azo component is replaced by 11 parts of N-hydroxypropyl-N-cyanoethyl-aminobenzene, then a dyestuff is obtained which corresponds to the formula

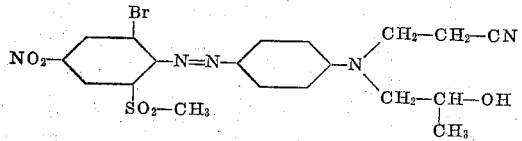

and which dissolves in concentrated sulfuric acid with a red-orange and in ethanol with a brown coloration. The red powder has similar dyeing properties as the dyestuff of Example 1.

*Example 5*

If in Example 1 the azo component is replaced by 8 parts of N-methyl-N-cyanoethyl-aminobenzene, then a dyestuff is obtained which corresponds to the formula

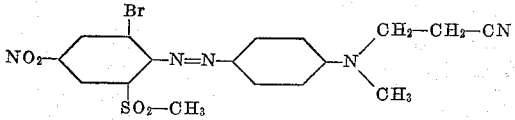

and which dissolves in concentrated sulfuric acid with a yellow-orange and in ethanol with a brown coloration. The brown powder has similar properties as the dyestuff of Example 1.

*Example 6*

If in Example 1 the azo component is replaced by 9 parts of N-ethyl-N-cyanoethylaminobenzene, then a dyestuff is obtained, which corresponds to the formula

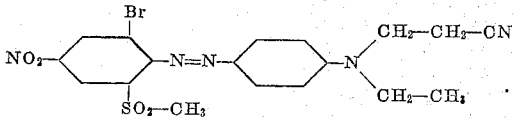

and which dissolves in concentrated sulfuric acid with a yellow-orange and in ethanol with a brown coloration. The brown powder dyes acetate silk and polyamide fibers in a somewhat more bluish shade than the dyestuff of Example 1.

*Example 7*

If in Example 1 the azo component is replaced by 12 parts of 1-(N-hydroxyethyl-N-cyanoethyl)-amino-3-chlorobenzene, then a dyestuff is obtained which corresponds to the formula

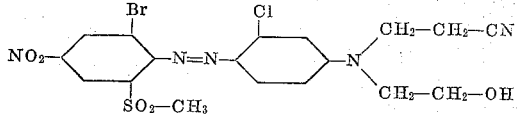

which dissolves in concentrated sulfuric acid with an eosine-red and in ethanol with a yellowish brown coloration and which dyes acetate silk in more yellowish shades than the dyestuff of Example 1.

*Example 8*

If in Example 3 the azo component is replaced by 43 parts of 1-(N-hydroxyethyl-N-cyanoethyl)-amino-3-methylbenzene, then a dyestuff is obtained which corresponds to the formula

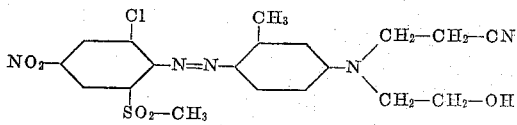

and which dyes acetate silk in red-brown shades. The tints on polyamide fibers are somewhat more bluish.

*Example 9*

1.5 parts of the dyestuff according to Example 1 are dispersed with the aid of Turkey red oil, and the resulting dispersion is used for dyeing 100 parts of acetate silk in a soap bath in the conventional way, preferably at elevated temperature. Brown shades of excellent fastness properties are obtained. In order to enhance the dispersion, the dyestuff may be ground, prior to the dyeing process, with a wetting agent or emulsifier, preferably in the presence of an inorganic salt such as sodium sulfate.

*Example 10*

10 parts of a 20% paste of the dyestuff of Example 8 are intimately admixed with 10 parts of diethylene glycol and 80 parts of gum arabic thickener. The resultant printing paste gives, on acetate silk, after steaming brown prints of excellent fastness properties.

Having thus disclosed the invention, what is claimed is:

1. A monoazo dyestuff which corresponds to the formula

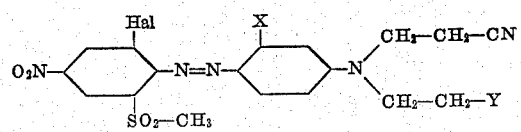

wherein Hal stands for a member selected from the group consisting of chlorine and bromine, X stands for a member selected from the group consisting of hydrogen, chlorine and methyl, and Y stands for a member selected from the group consisting of hydrogen and hydroxyl.

2. The monoazo dyestuff which corresponds to the formula

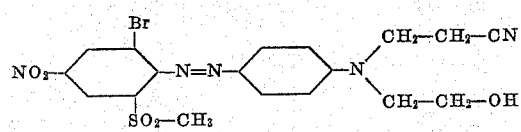

3. The monoazo dyestuff which corresponds to the formula

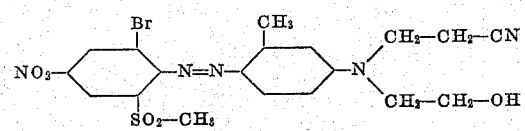

4. The monoazo dyestuff which corresponds to the formula

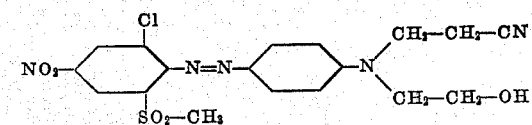

5. The monoazo dyestuff which corresponds to the formula

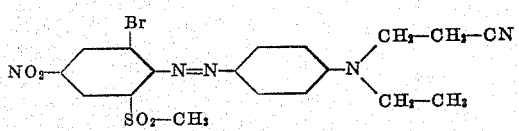

6. The monoazo dyestuff which corresponds to the formula

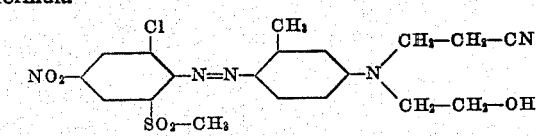

References Cited in the file of this patent

UNITED STATES PATENTS

| | | |
|---|---|---|
| 2,492,971 | Dickey | Jan. 3, 1950 |
| 2,590,092 | Dickey | Mar. 25, 1952 |